United States Patent [19]

Amdahl et al.

[11] 3,858,183

[45] Dec. 31, 1974

[54] DATA PROCESSING SYSTEM AND METHOD THEREFOR

[75] Inventors: Gene M. Amdahl, Saratoga; Richard J. Tobias, Palo Alto, both of Calif.

[73] Assignee: Amdahl Corporation, Sunnyvale, Calif.

[22] Filed: Oct. 30, 1972

[21] Appl. No.: 302,229

[52] U.S. Cl. .............................................. 340/172.5
[51] Int. Cl. .......................... G06f 3/00, G06f 13/00
[58] Field of Search .................................. 340/172.5

[56] References Cited

UNITED STATES PATENTS

| | | | |
|---|---|---|---|
| 3,401,375 | 9/1968 | Bell et al. | 340/172.5 |
| 3,401,376 | 9/1968 | Barnes et al. | 340/172.5 |
| 3,543,245 | 11/1970 | Nutter | 340/172.5 |
| 3,614,747 | 10/1971 | Ishihara et al. | 340/172.5 |
| 3,629,845 | 12/1971 | Chisholm et al. | 340/172.5 |
| 3,662,348 | 5/1972 | Weiss | 340/172.5 |
| 3,676,846 | 7/1972 | Busch | 340/172.5 |
| 3,699,530 | 10/1972 | Capowski et al. | 340/172.5 |
| 3,739,352 | 6/1973 | Packard | 340/172.5 |

*Primary Examiner*—Gareth D. Shaw
*Assistant Examiner*—Mark Edward Nusbaum
*Attorney, Agent, or Firm*—Flehr, Hohbach, Test, Albritton & Herbert and David E. Lovejoy

[57] ABSTRACT

A data processing system and method in which a high speed buffer couples main storage with the CPU and where the configuration is an eight byte data buss between buffer and main storage and a four byte data buss between the CPU and buffer. Unique gating provides for the foregoing configuration along with necessary alignment and also for sign extension and blanking without the requirement of additional cycle time.

17 Claims, 10 Drawing Figures

FIG. 7

(ADD. BITS 22, 23)
1. DECODE
2. LEFT/RIGHT
3. LENGTH

| | 00 | | | | | | | 01 | | | | | | | 10 | | | | | | | 11 | | | | | | |
|---|---|---|---|---|---|---|---|---|---|---|---|---|---|---|---|---|---|---|---|---|---|---|---|---|---|---|---|---|
| | LEFT | | | | RIGHT | | | LEFT | | | | RIGHT | | | LEFT | | | | RIGHT | | | LEFT | | | | RIGHT | | |
| GATE SIGNAL | 1 | 2 | 3 | 4 | 1 | 2 | 3 | 1 | 2 | 3 | 4 | 1 | 2 | 3 | 1 | 2 | 3 | 4 | 1 | 2 | 3 | 1 | 2 | 3 | 4 | 1 | 2 | 3 |
| A/E TO W | X | X | X | X | | | | | | | | | | | | | | | | | | | | | | | | |
| B/F TO W | | | | | | | | X | X | X | X | | | | | | | | | | | | | | | | | |
| C/G TO W | | | | | | | | | | | | | | | X | X | X | X | | | | | | | | | | |
| D/H TO W | | | | | | | | | | | | | | | | | | | | | | X | X | X | X | | | |
| A/E TO X | | | | | | | X | | | | | | | | | | | | | | | | X | X | X | | | |
| B/F TO X | | X | X | X | | | | | | | | | | X | | | | | | | | | | | | | | |
| C/G TO X | | | | | | | | | X | X | X | | | | | | | | | | X | | | | | | | |
| D/H TO X | | | | | | | | | | | | | | | | X | X | X | | | | | | | | | | X |
| A/E TO Y | | | | | | X | | | | | | | | | | | X | X | | | | | | | | | | X |
| B/F TO Y | | | | | | | X | | | | | | X | | | | | | | | | | | X | X | | | |
| C/G TO Y | | | X | X | | | | | | | | | | X | | | | | | X | | | | | | | | |
| D/H TO Y | | | | | | | | | | X | X | | | | | | | | | | X | | | | | | X | |
| A/E TO Z | | | | | X | | | | | | X | | | | | | | | | | X | | | | | | X | |
| B/F TO Z | | | | | | X | | | | | | X | | | | | | X | | | | | | | | | | X |
| C/G TO Z | | | | | | | X | | | | | | X | | | | | | X | | | | | | X | | | |
| D/H TO Z | | | | X | | | | | | | | | | X | | | | | | X | | | | | | X | | |

SHIFT & ALIGNMENT CONTROL

DATA PROCESSING SYSTEM AND METHOD THEREFOR

BACKGROUND OF THE INVENTION

The present invention is directed to a data processing system and method therefor and more specifically to transference of data between main storage and the CPU by a high speed buffer storage unit.

In a large scale computer, efficiency of operation is improved by providing a cache memory or buffer storage unit between the relatively large main storage and the central processing unit (CPU). The logical parameters such as line size, buffer size, adder width etc., are determined by the performance desired for a given base cost. However, the criteria used for the actual physical widths of both the data busses and various registers includes cost and complexity and cycle time. For example, ideally a very large buss width would provide for a maximum rate of data transfer between main storage and buffer storage. However, this decreases reliability since the large number of wires and connectors increase the probability of failure. Also, a narrow width buss is preferable in coupling the buffer storage to the CPU since this reduces the size of the registers and gating required in the CPU. But on the other hand, a narrow width buss requires additional buffer cycles to complete the full line logical transfer.

In all the foregoing, the amount of time to transfer data between main storage and buffer storage and CPU must be minimized. Any additional gating required by complexities in interfacing main storage with the CPU normally adds gating and thus additional cycle time. This is especially true where the width of the data buss connecting main storage with buffer storage is of a different size than the data buss coupling the buffer storage to the CPU.

OBJECTS AND SUMMARY OF THE INVENTION

It is, therefore, an object of the present invention to provide an improved data processing system and method therefor which utilizes buffer storage but still maintains a low cycle time.

In accordance with the above object, there is provided a data processing system having a central processing unit (CPU), main storage (MS), and a high speed buffer storage (HSB) coupling the CPU to the MS. The MS is coupled to the HSB by a parallel line connection which will accommodate a predetermined plurality of bytes both for moving data out of and into the MS. The HSB comprises a plurality of storage units for storing the predetermined plurality of bytes. Each of the units corresponds to a predetermined byte. Gating means are provided for bundling the data outputs of non-sequential pairs of all of the storage units. The data outputs of the plurality of storage units is coupled separately back to the MS to move in said predetermined plurality of bytes. Only one storage unit of each of the pairs is enabled at any one time. Word register means (WR) are coupled to the gating means for storing a number of bytes corresponding to the pairs. This number is a fraction of the predetermined plurality of bytes. The WR is also coupled to the CPU.

From a method standpoint, there is provided a data processing method for transferring data between a main storage (MS) and a central processing unit (CPU) by use of an intermediate high speed buffer storage (HSB). Eight bytes of data are moved in parallel from the MS to the HSB, and this is repeated for four cycles to provide a 32 byte data line. Four bytes of the 32 bytes are sequentially fetched from the HSB to the CPU. Four bytes from the CPU are stored in the HSB. Thirty-two bytes of data are moved out from the HSB to the MS in four cycles.

BRIEF DESCRIPTION OF THE DRAWINGS

FIG. 7 is a control chart useful in understanding the operation of the logic of FIGS. 5A, 5B, 6A and 6B and in understanding the operation of a block of FIG. 2.

DETAILED DESCRIPTION OF THE PREFERRED EMBODIMENT

Figure 1:
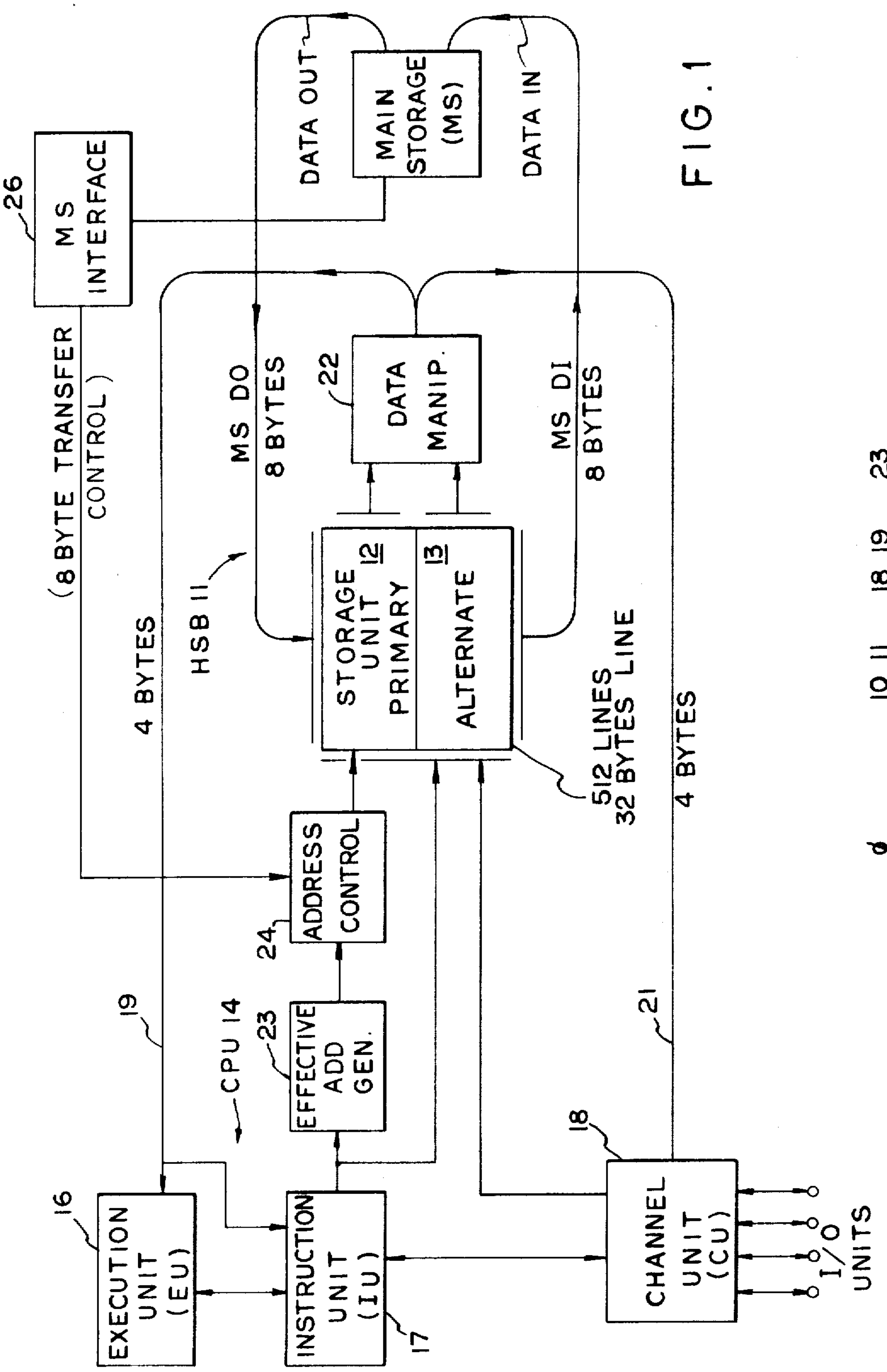
FIG. 1 is an overall block diagram of the data processing system of the present invention.

FIG. 1 illustrates a block diagram which is typical of a large scale computer. The computer includes main storage (MS) 10 which is coupled to a high speed buffer storage (HSB) unit 11 having a primary portion 12 and an alternate portion 13. The coupling is accomplished on an 8 byte parallel buss the output data buss being designated MS DO and the input data buss to main storage, MS DI. High speed buffer unit 11 will store 512 lines of data from the main storage 10 with a line having a logical width 32 bytes. The 32 byte line configuration is standard for many large scale computers. High speed buffer (HSB) 11 thus, will store 256 lines of data in its primary portion 12 and 256 lines of data in alternate portion 13.

A 32 byte line of data is read into and out of the main storage 10 unit in four cycles of 8 bytes each. HSB 11 is set associated with main storage unit 10; that is, a given address in main storage has a predetermined location in each of the halves 12 and 13 of HSB 11. As is well known in the art, such locations in HSB 11 may not be identical in the primary and alternate halves.

HSB 11 is coupled to a central processing unit 14 which includes execution unit 16 and instruction unit 17 and is also coupled to a channel unit 18 by 4 byte busses 19 and 21 respectively. Manipulation of the initial 8 byte unit of data stored in the buffer 11 is accomplished by data manipulation unit 22 (also a part of buffer 11) which will be explained in detail below. Addressing is provided by an effective address generator 23 coupled to instruction unit 17, and an address control unit 24. A main storage interface unit 26 coupled to main storage 10 also provides for the move out and move in of data to main storage.

The overall operation of the computer including the CPU 14, channel unit 18, buffer 11 and main storage 10 is disclosed in a copending application entitled Data Processing System in the name of Amdahl et al., filed Oct. 30, 1972, Ser. No. 302,221.

Figure 1A:
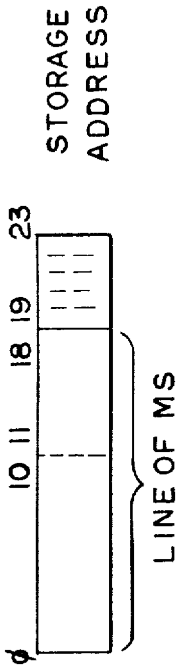
FIG. 1A illustrates the format of the buffer storage address.

FIG. 1A illustrates a typical storage address for main storage 10 which is 24 bits in length. The 0 through 18 bits designate the line of main storage which is desired, bits 0 through 10 are for indexing purposes and bits 11 through 18 address the high speed buffer. Bits 19 through 23 are for control purposes which will be discussed below. In general, the data processing system as set out in FIG. 1 is programmable with all IBM 360 and IBM 370 programs.

Figure 2:
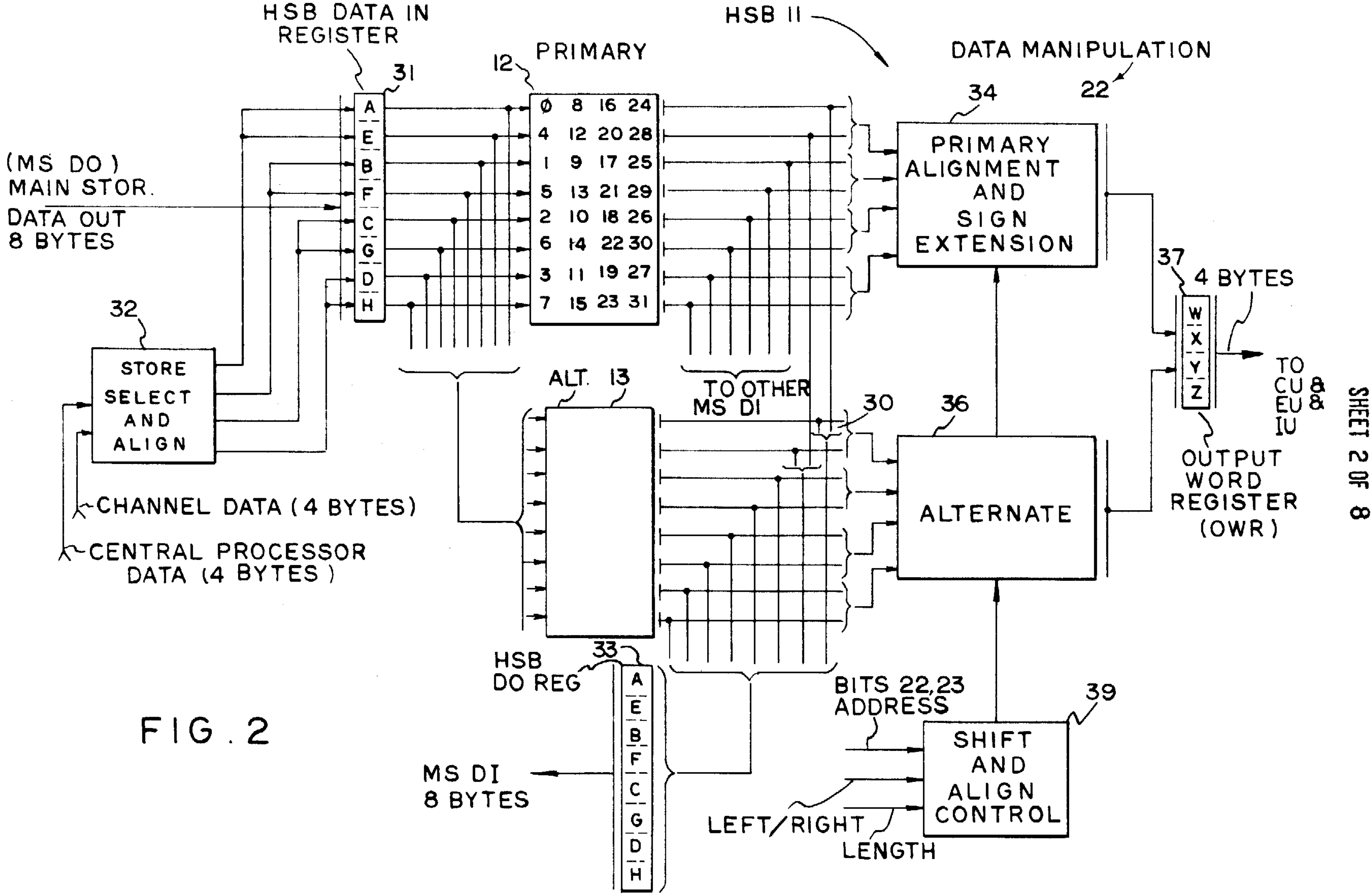
FIG. 2 is a more detailed diagram of the buffer storage unit of FIG. 1.

FIG. 2 illustrates in greater detail high speed buffer 11 along with the associated control apparatus for moving data between main storage and the buffer. Associated with primary storage portion 12 and an alternate storage portion 13 in a HSB data in register 31 having storage for 8 bytes A through H. The data out buss, MS DO of main storage is coupled to register 31 as well as inputs from the central processor unit. However, these are coupled through store select and align logic 32. Output from this logic is 4 bytes wide since this is the interface between the CPU and the buffer unit 11. Register 31, to accommodate this 4 byte width, couples the same byte of data from the store select and align 32 into a pair of its storage units. Thus, the HSB appears to the 4 byte input data as two 4 byte data registers with the byte pairs A/E, B/F, C/G, and D/H loaded with the same information below. Enable signals coupled to the buffer portions 12 and 13 select the proper bytes to be written.

Thus, in brief summary, the data structure provided by buffer 11 and its register 31 is truly an 8 byte structure for the output buss MS DO of main storage and at the same time a 4 byte structure for data from the CPU or the channel.

However, when 4 byte data is to be moved into buffer 11 a selection of data must be made. This is accomplished by store select logic 32. After selection is made, alignment is required which is the inverse of the alignment that takes place at the outputs of buffer 11 when 4 bytes are being read out. This alignment must take place so that input bytes are aligned correctly in the manner in which the buffer itself is arranged. Thus, specifically, where a byte is to be stored in the 0, 8, 16 or 24 positions of the 32 byte line of primary storage 12, it must be placed in the "A" byte of register 31.

Alignment is merely a simple rotation. Such alignment will be discussed in detail in relation to the alignment of the output of buffer 11 and thus the input store alignment will be accomplished using the same techniques.

The data outputs of the various storage units of buffer 11 are coupled to primary alignment and sign extension unit 34 and alternate unit 36. These outputs are also coupled back into main storage through the MS DI lines by means of HSB data out register 33. As indicated at 30, the data out lines of primary and alternate buffer portions 12 and 13 are bundled or DOT ORed at the inout of HSB DO register 33.

The primary alignment and sign extension units 34 and 36 in combination with word register 37 are part of data manipulation unit 22 (FIG. 1) which also includes a shift and align control unit 39 which provides for various control inputs to the alignment units 34 and 36 and is responsive to various control inputs from CPU 14.

Figure 3:
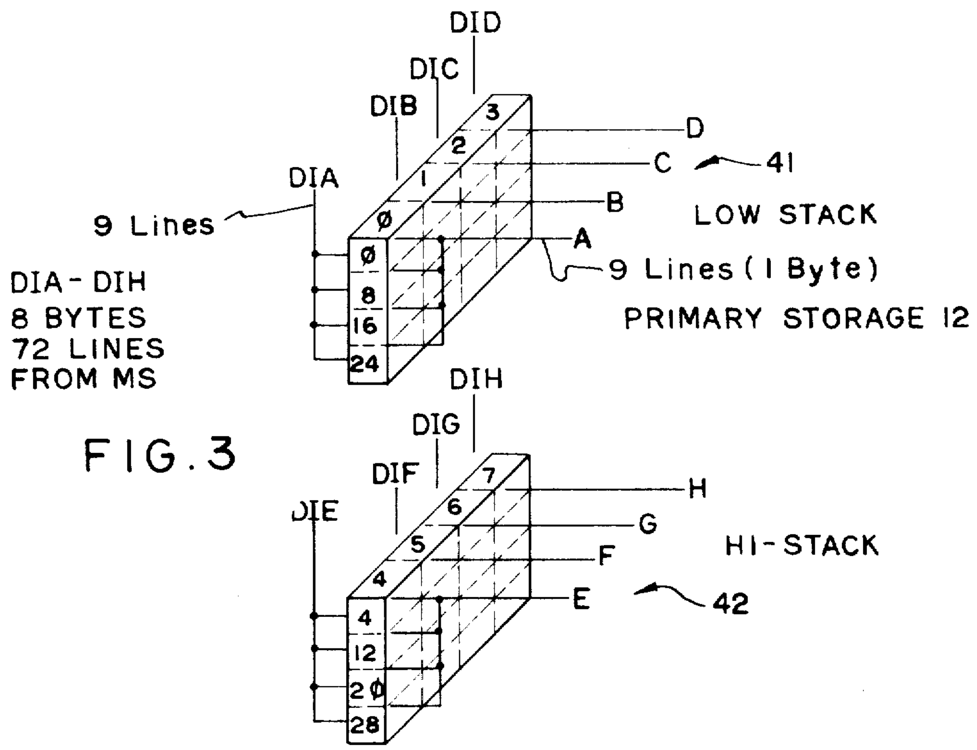
FIG. 3 is a representational perspective view of actual storage elements of FIG. 2.

FIG. 3 illustrates the equivalent physical configuration of primary buffer storage unit 12. It includes a low stack 41 and a high stack 42 each being 4 bytes wide. These are indicated in the case of stack 41 by the bytes A, B, C and D and in stack 42 by the bytes E, F, G and H. Thus, there are eight rows of 4 bytes each which can be designated in the case of the low stack beginning with bytes 0, 8, 16 and 24 and in the case of the high stack with bytes 4, 12, 20 and 28. Each storage unit of a stack will store one byte and there are 32 bytes to be stored. From a data input standpoint, as illustrated the bytes 0, 8, 16 and 24 are tied together and are fed data from an A input line from the data register 31 (FIG. 2). Similarly, in the high stack 42 the bytes 4, 12, 20 and 28 are tied together and data input from the E byte of register 31. In the same manner the data inputs for the remaining bytes as indicated are tied together as is apparent from the numbering scheme illustrated in FIG. 2 for primary storage unit 12.

Data outputs of the storage units correspond to the inputs with the example in the low stack 41 of bytes 0, 8, 16 and 24 being tied together to from the A data output line. Actually this line is, of course, nine lines since the byte is nine bits; eight data bits and one parity bit. When 8 bytes of data are moved in from data register 31 (which were received from main storage), initially bytes 0 through 7 are filled and thereafter bytes 8 through 15, 16 through 23, and 24 through 31 in successive cycles. This is apparent from examination of unit 12 of FIG. 2.

Figure 4:
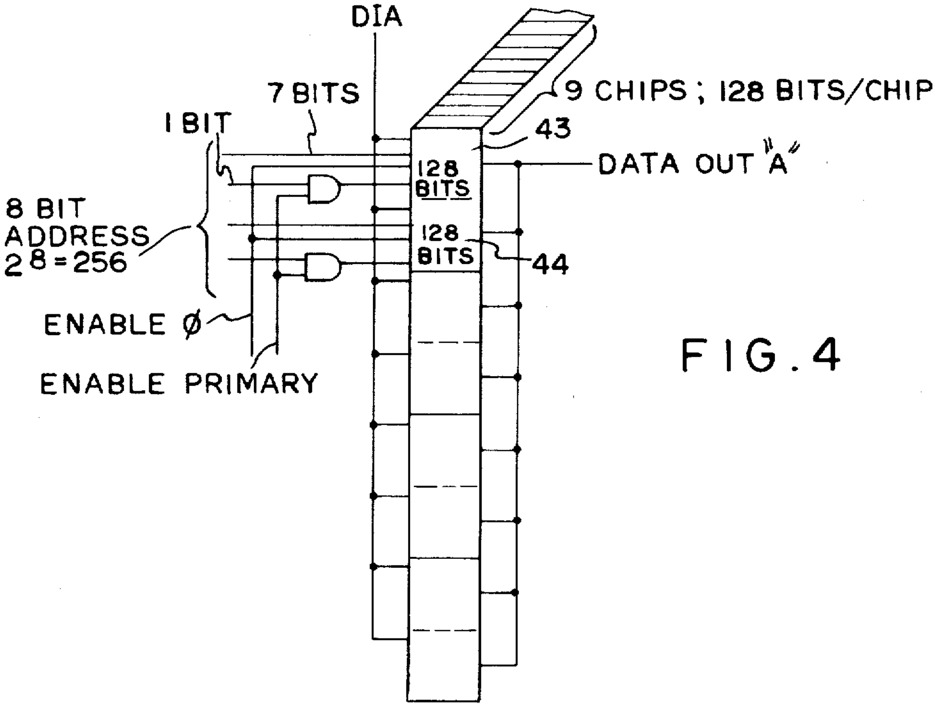
FIG. 4 is a representational perspective view of a portion of FIG. 3 in greatly enlarged detailed.

FIG. 4 indicates the actual physical configuration of the storage units for bytes 0, 8, 16 and 24 of FIG. 3 and more specifically, byte 0. Since in the primary storage unit there are 256 lines of data to be stored (see FIG. 1), byte 0 includes two semiconductor storage chips 43 and 44 for bit 0 of that byte which total 256 bits. Each chip 43 and 44 has enable inputs designated enable 0 and enable primary, along with a seven line address ($2^7$= 128). The enable primary line includes an AND gate to accommodate the eight address bits, whereby 1 out of 256 bits (two chips) may be addressed. This corresponds to one line of 256 lines of the primary storage unit 12. To provide an entire byte, a row of nine chips is provided. An eight bit address is provided to select the decoded line as illustrated in FIG. 1A by bits 11 through 18 of the storage address.

FIGS. 5A, 5B, 6A and 6B illustrate in greater detail the high speed buffer storage unit 11 including primary and alternate units 12 and 13 and the data alignment units 34, 36 as illustrated in FIG. 2 in block diagram form. Referring to FIGS. 5A, 5B, 6A and 6B together data outputs include lines designated MS 0 through MS 7 which provide the 8 byte width data input buss to main storage as illustrated in FIG. 1 designated MS DI and as illustrated in FIG. 2. In addition, word register lines designated WRO through WR3 provide both data and a parity bit input to the word register 37 of FIG. 2. From an input standpoint storage unit 11 has data inputs corresponding to FIG. 3 from the data register 31 of FIG. 2. However, for the purpose of clarity these data inputs are not illustrated and only enable control inputs are illustrated in FIGS. 5A, 5B, 6A and 6B.

In FIGS. 5A, 5B, 6A and 6B the following conventions have been used.

G is a data gate.

A is an "AND" function.

I is "NOT" or "Invert" function.

O is an "OR" function.

A group of circled wires is a bundle being gated and a control signal in a gate is indicated by an arrowhead.

Figure 5A:
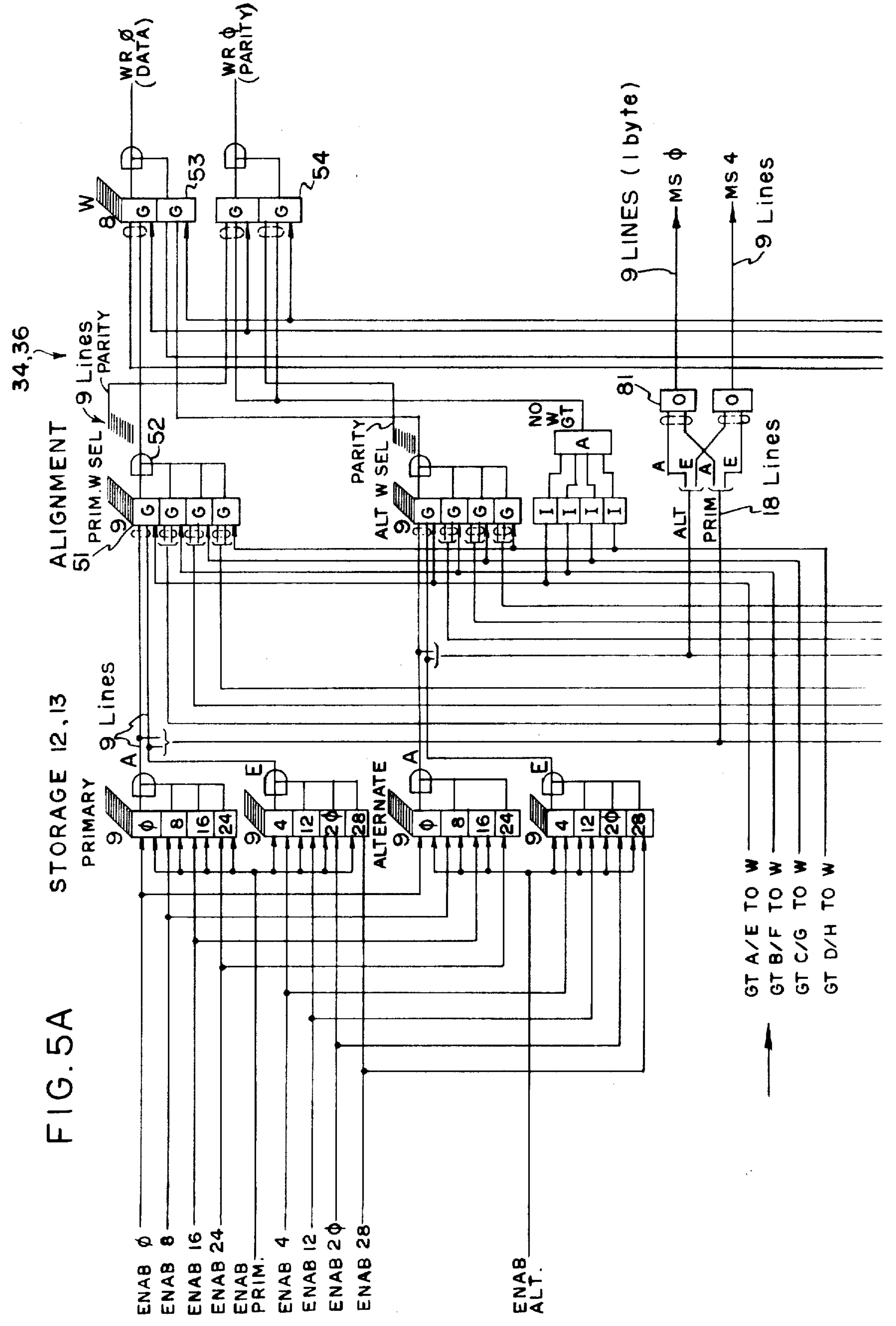
FIGS. 5A and 5B are detailed logic diagrams of a portion of FIG. 2.
Figure 5B:
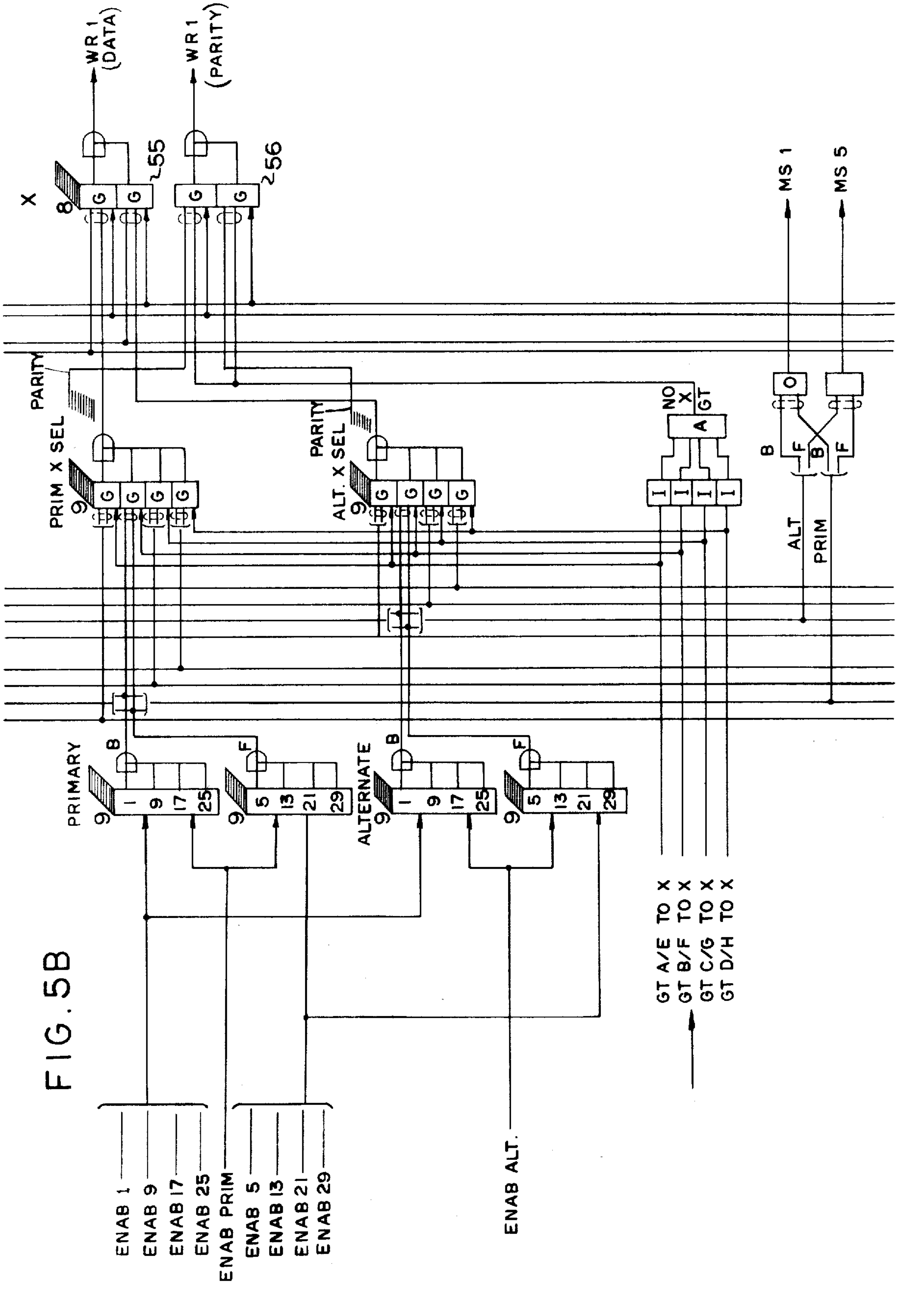
Figure 6A:
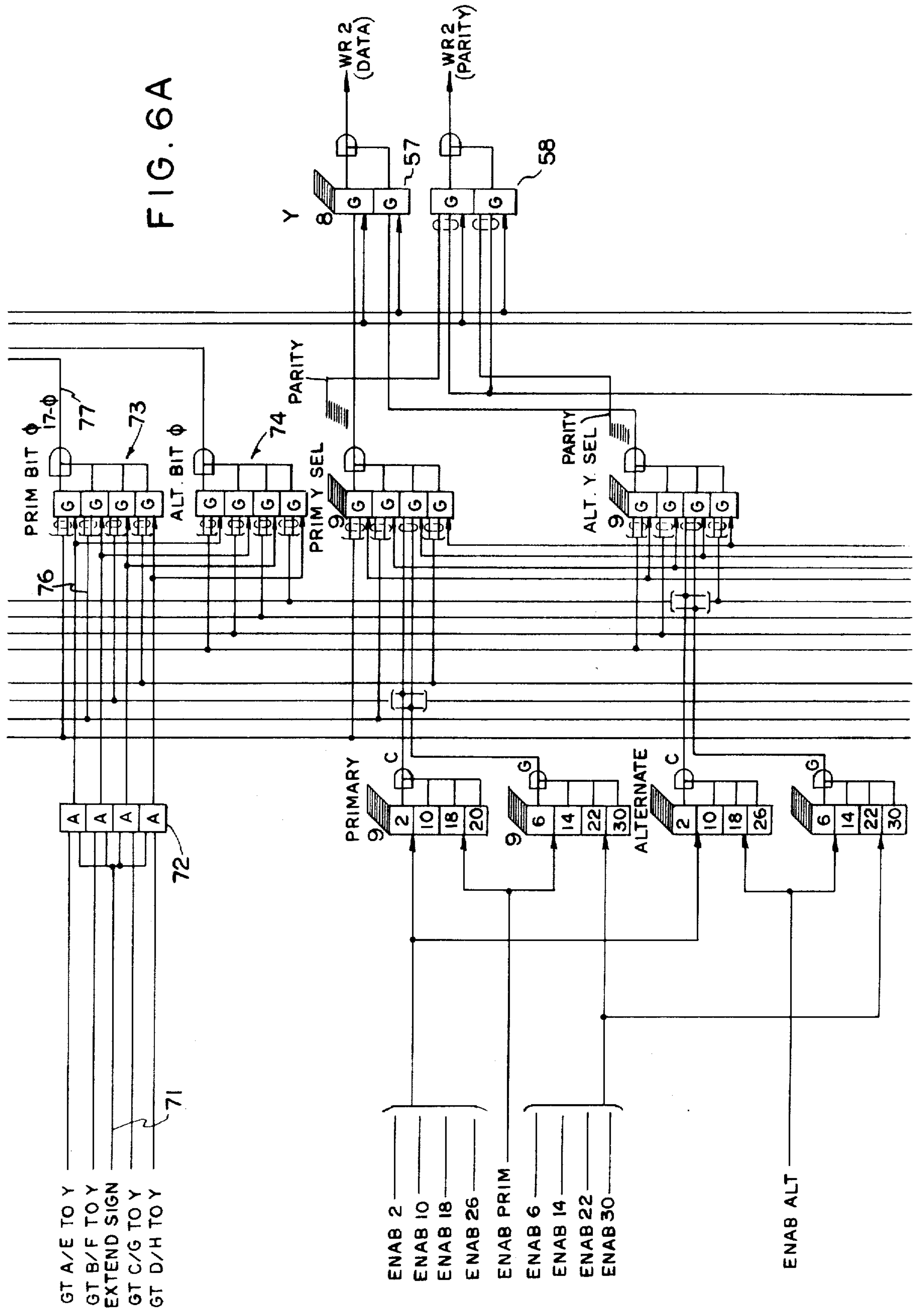
FIGS. 6A and 6B are detailed logic diagrams of a portion of FIG. 2.
Figure 6B:
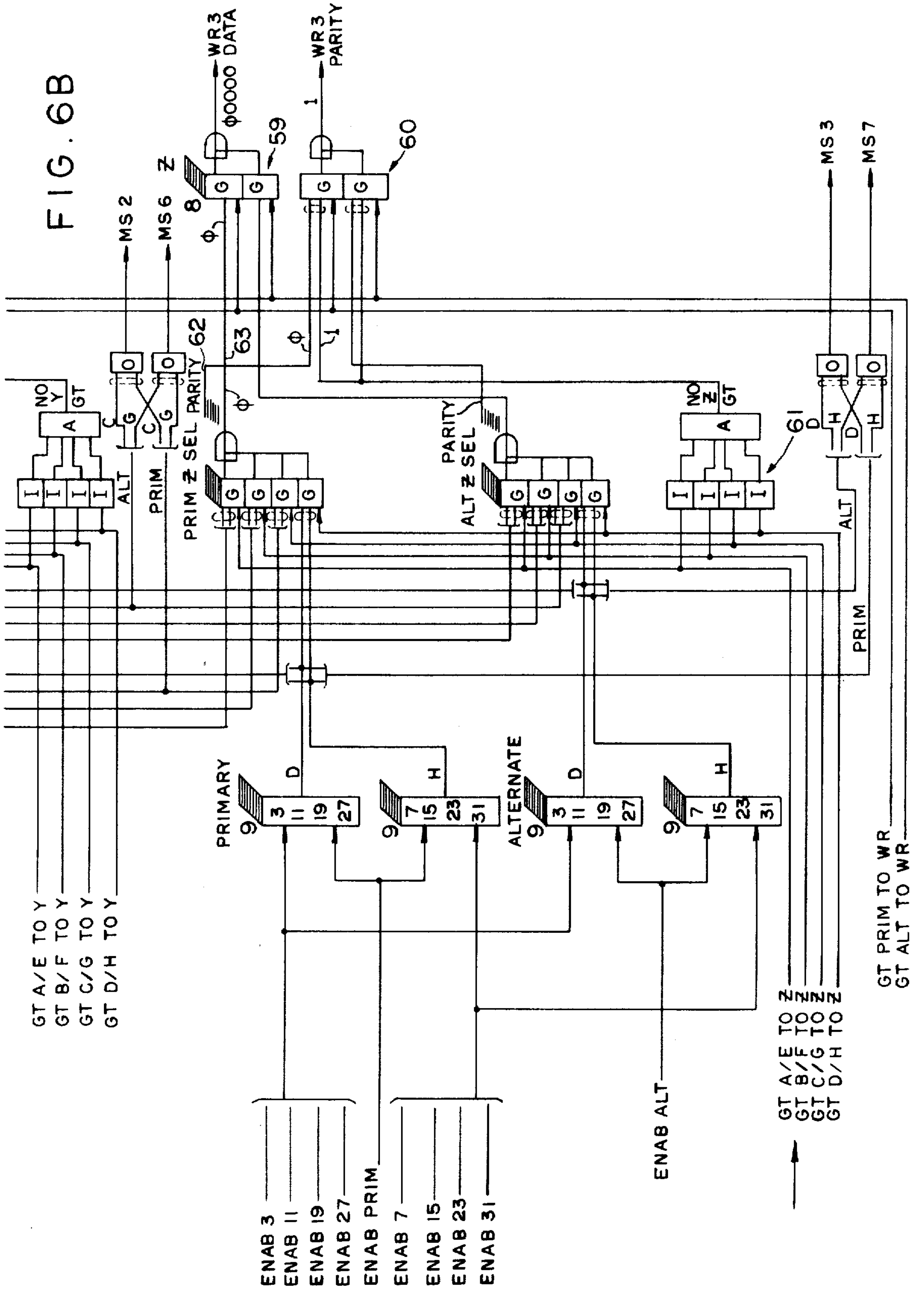

The bytes A through F of storage unit 11 are separately indicated; that is, in the FIGS. 5A and 5B the bytes A and E and their alternates and the bytes B and F and their alternates. In FIGS. 6A and 6B there are illustrated the bytes C and G and their alternates and the bytes D and H and their alternates.

The detailed logical structure of the overall buffer storage and its data manipulation units is best explained in a typical operating sequence. Such sequence would include a move in of 8 bytes from main storage to the buffer 11, fetching 4 bytes from the high speed buffer 11 to the CPU through the word register, storing 4 bytes in the high speed buffer from the CPU and moving out 8 bytes back to main storage.

Assuming the buffer is empty and a requst is made by the storage address, the channel unit 18 as illustrated in FIG. 1, or CPU 14, a complete line of information (32 bytes) which contains the requested byte will be moved into the buffer, 8 bytes at a time. Thus, four cycles will be required. The first 8 bytes are presented to the individual storage units of the buffer and they are moved into byte positions 0 through 7; in a second cycle data is moved into bytes 8 through 15; in a third cycle 16 through 23, and in the fourth cycle 24 through 31. Since the input data buss itself is only 8 bytes wide the four cycles are segregated by the various enable lines coupled to the respective bytes of corresponding storage units.

More specifically, with respect to the enabling function for an 8 byte move into buffer storage 11, the address structure would indicate that this move into storage will start with byte 0. This will cause the enable lines 0, 1, 2 and 3 to be active. Moreover, the fact that this is 8 byte transfer, will also cause enable lines 4, 5, 6 and 7 to be active. This 8 byte transfer control is an output from main storage unit 26 illustrated in FIG. 1. Thus, although as illustrated in FIG. 3, the input data lines would be common for byte positions 0, 8, 16 and 24, only byte 0 would be filled. For the second cycle of transfer, the addressing structure would indicate that byte 8 was being transferred which would cause enable lines 8, 9, 10 and 11 to be active and since it is an 8 byte transfer this would also cause enable lines 12, 13, 14 and 15 to be active. The procedure of activating enable lines takes place until the last group of 8 bytes has been transferred.

In general, the addressing structure illustrated in FIG. 1A is presented to the address control unit 24 (FIG. 1) of the storage unit and defines which byte is being specified. However, for an 8 byte transfer in the present example, where it is assumed that the first transfer would specify byte 0 by decoding the low order five bits of the addressing structure, these bits are provided by the MS Interface 26. Thus, for the first cycle of transfer, the low order five bits will be all zeros. Next, an expansion will be caused from 0 to 1, 2 and 3 and the appropriate enable signals will be activated. Since an 8 byte transfer is indicated, this will cause the next four enable signals to be active. The specific enable signals will enable bytes 4, 5, 6 and 7 in view of the all zeros in the low order 5 bits. For the second move in cycle, the addressing structure and the low order five bit positions will indicate byte 8 with the structure 01000, which when decoded indicates 8. This structure will cause an expansion of the next three bytes 9, 10 and 11. Then because of the 8 byte transfer the enable controls for bytes 12, 13, 14 and 15 are activated. Similarly, in the third cycle, the low order bit structure is 10000 and for the fourth and last cycle the bit structure is 11000.

All of the foregoing decisions are made in the address control unit 24 which controls the enable inputs of the individual storage units.

In the next normal sequence of operation, after having moved in a line (32 bytes) from main storage, 4 bytes of those 32 bytes are fetched out and coupled to the CPU via the word register.

If data is addressed on an off word boundary, with the word consisting of 4 bytes, alignment is necessary so that the bytes will appear in a sequential order. For example, when one byte is addressed and the input address specifies that the byte is to be placed in the left most or "W" position of the word register, this address can specify any byte from 0 to 31 since a line of bytes contains 32 bytes. From a programming configuration point of view, when an input byte is specified by the programmer at most only three more bytes beyond that byte can be transferred on one cycle since the data buss width in relation to the CP is 4 bytes. Thus, alignment between the buffer word register is necessary in order to keep the 4 bytes in their sequential order. This should be done without paying penalties in additional cycles in realigning. For example, if byte 17 is specified the subsequent 3 bytes would be 18, 19 and 20. However, from inspection of FIG. 3 byte 20 is located in a separate stack 42 and thus some alignment must occur since byte 20 is not in the first column of stack 41. Also since byte 20 is in a different stack, bundling is necessary.

From an overall view point, the data storage chips which contain the bytes of a line are organized to allow bundling of wires. Of the 8 bytes, 0, 8, 16, 24, 4, 12, 20 and 28 only one of these bytes can possibly be specified for transfer on any one addressing request. This is because a maximum of only 4 bytes can be transferred. Only one of the eight enable lines for these 8 bytes will be active and the other seven inactive. Thus, on the data output lines of the storage units; specifically, the lines A and E, only one possible byte may be active. Therefore, as illustrated in FIG. 5 lines A and E may be bundled as indicated at the gate 51. The lines A and E represent, of course, non-sequential pairs of the storage unit. In fact, in the preferred embodiment, the bundling takes place with pairs that are separated by 3 bytes from each other; that is, A/E, B/F, C/G, D/H. The 3 byte separation is, of course, one less than the number of bytes in a word. This bundling can be observed respectively at both the primary and alternate W selector register, which are included in alignment units 34, 36, the W being related to the W byte of the word register 37 in FIG. 2. The same is true for X, Y and Z selector register.

In the present example, it is assumed that the low order five bits of the addressing structure (FIG. 1A) were coded as 10001 which decodes to byte 17. The address control unit 24 (FIG. 1) expands 17 to also include 18, 19 and 20. Therefore, the enable lines for bytes 17 through 24 of storage 11 will be active and byte 17 will appear on the B line, byte 18 on the C line, byte 19 on the D line and byte 20 on the E line. The foregoing lines are bundled as A/E, B/F, C/G and D/H. As discussed above, data will only appear on one of each pair the data output lines. In the case of byte 17, this will be the E line with the A line being inactive. Thus, by use of the enabling control inputs only one storage unit of each of the pairs is enabled at any one time.

Since the byte addressed initially was byte 17 the lines B and F, which are in the second position as they leave the buffer or storage 17, must be rotated to the first position before data from those lines is placed into the word register. Thus, each of the bundled set of wires must be rotated up by one position. Shift and alignment control unit 39 (FIG. 2) senses the addressing structure of the low order two bits to provide for alignment. Specifically, the gating as indicated by the arrow, activates the control inputs B/F of the W selector, C/G of the X selector, D/H of the Y selector and A/E of the Z selector. For example, the W selector register includes along with the gate 51 which is activated by the B/F control input, three additonal gates which receive the remainder of the bundled pairs of data outputs from storage units 11. Control inputs selectively enable one of these pairs to provide alignment. Thus, for example, the W selector may selectively receive data from pairs A/E, B/F, C/G and/or D/H.

All of the foregoing is controlled by the shift and align control unit 39 of FIG. 2. Specifically, in the shift and align control unit 39 there is a mechanism for deciding which byte of the buffer must be placed into which byte position of the word register. The inputs to this unit are the two lower order bits of the five bit address illustrated in FIG. 1A as discussed above. Referring briefly to the chart of FIG. 7, it illustrates the various states of these two lower order bits; that is, 00, 01, 10 and 11. More specifically, the address bits 22 and 23. In the case of byte 17 the two lower order bits are 01. The second input to the shift and align control register is left/right but this is only meaningful if the request is for less than 4 bytes as will be discussed below. However, since the length is four as indicated, going down the column, decode 01 and length 4, X's indicate that the gate signals are B/F to W, C/G TO X, D/H to Y and A/E to Z. The chart of FIG. 7 will be used in greater detail to illustrate a situation of where the length is less than four. With the use of the chart of FIG. 7, the construction of the proper control logic would be obvious to one skilled in the art.

Referring again to FIGS. 5 and 6 the output of the selector gates W, X, Y and Z are DOT ORed together; for example, in the case of primary selector gate W, by DOT OR gate 52. This can be done since only one of the four gates will be active at one time due to the nature of the control inputs. The output of DOT OR gate 52 is coupled to input gating means 53 of word register 37 (FIG. 2) for the W byte of the word register. The gating means also include the gating means 54 for parity bit of that byte of the register. The remaining input gating means for the word register are similarly coupled to corresponding selector; specifically, for X selector data input gate 55 and parity gate 66, for the Y selector byte, data input gate 57 and parity gate 58, and for the selector Z data input gate 69 and parity gate 70. These gates each include two portions ORed together to accommodate the primary and alternate portions of buffer storage unit 11.

BLANKING

In the case where the CPU specifies to the buffer storage unit that less than 4 bytes are wanted in the word register then the non-specified byte positions of the word register must contain all zeros for a data byte. In addition, the proper parity which is a "1" for all zeros must be provided. This is accomplished by control input signals from the shift and align control block 39 of FIG. 2 as illustrated on the chart of FIG. 7. The specified illustration is outlined. Thus, it is assumed that byte 17 is the initial byte requested with the decode bits 22 and 23 being 0, 1 respectively, a length of 3 and left justification. It is apparent that the first three gating signals which were active in the case of byte 17 with a length of 4 bytes would be active. Thus, bytes 17, 18 and 19 would be put in the proper position with the same procedure as before. However byte 20 has not been specified and the requirement is that the Z position of the word register must contain all zeros with good parity. This will be accomplished since the gate A/E to Z will not be activated. When this occurs, a parity bit generator indicated at 61 of FIG. 6 which is composed of four invert or NOT gates coupled to the individual control signal inputs with the output of the NOT gate coupled to an AND gate, will cause the AND gate because of the coincidence condition of all inactive control signals to produce a 1. Moreover, the output Z select logic since no control input is activated, will be zeros. Parity line 62 along with the data lines 63 of the primary Z selector will produce all zeros. When the 1 output of the AND gate 61 is bundled in the input gating 60 for the parity bit of the word register, the result of the zero and one bundle is equal to 1. Thus, in the parity position of the byte Z of the word register a 1 is loaded. The foregoing applies in the case of other lengths as illustrated in the chart of FIG. 7.

SIGN EXTENSION

Where a half word operand is desired, where the programmer desires to conserve storage, the length of the word request is equal to 2 but with right justification. Thus, the left most 2 bytes, that is W and X of the word register, remain open. In this situation, if sign extension were not specified, the left most 2 bytes would be blanked zeros. However, if sign extension is specified, then the left most 2 bytes of the word register will be filled in with the sign of the half word operand. This sign is the highest order bit of the length of data that has been specified. In the specific example, 2 bytes.

The reason for the necessity of sign extension with the half word operand is that the execution unit will only operate on a full word or 4 bytes. However, with sign extension a full word operand is simulated and thus the execution unit and all functional units associated with it can proceed without any knowledge of the actual half word nature of the operand.

A half word operand is positive in nature if the high order bit, the sign bit, is a zero. Sign extension in this case would propogate and propogated all zeros. That is if a zero is through the higher order 2 bytes of the word, and a full operand presented at the execution unit, the result is a positive number of the same value in the whole word operand as was previously held in the half word operand. The same holds true for negative number. However, a negative number in the present computer is represented by two's complement arithmetic. Thus a higher order bit of a half word will be a one. The property of two's complement arithmetic is that if the value of the number is negative, the one may be extended indefinitely and the value of the negative number does not change. Use is made of this property of two's complement arithmetic to extend negative numbers, namely, the one is extended into the higher order 2 byte positions, W and X, and the negative value of the resulting one word operand of 4 bytes is the same as the negative value that was represented by the half word of information.

Using again the same example where the low order five bit storage address is 10001 and decodes to byte 17, the length of the request in the case of a half word operand is now 2 bytes. Thus the bytes of interest are 17 and 18. The right justification input to shift and align control unit 39 will be flagged indicating that bytes 17 and 18 should be put in the right most 2 bytes of the word register; namely, bytes Y and Z. Thus, referring to the chart of FIG. 7, the gating control signals are B/F to Y which will cause byte 17 to be loaded into the Y position of the word register and gate C/G to Z which will cause byte 18 to be placed in the Z position of the word register. One further control signal input is the extend sign signal which occurs on the line 71 at the top portion of FIG. 6. This is coupled in commmon to four AND gates 72 and the other coincidence inputs of the AND gates being coupled both to individual control inputs identical to those of the Y selector. This is because of the four control signals of interest for the sign extension are the four signals that cause data to be gated to the Y byte of the word register. In the present example the C/F to Y signal is active. This is ANDed with the sign extension signal to cause bit 0 of byte 17 to be placed at the output of the primary bit 0 or alternate bit 0 selection logic 73, 74. The ORed outputs of logic unit 73, 74 are coupled to every data bit of both the W byte position of the word register and the X byte position of the word register by means of the input gating units 53 and 55. In other words, the output lines of selection logic units 73 and 74 are bundled with the data input lines to the gating units 53 and 55. Since the gating signal B/F to Y has been activated, the second gate of selector logic 73 will be activated. It is seen from inspection that data input line 76 is coupled to the data outputs B/F of the storage unit 11. However, line 76 only includes the lines containing the zero bits of bytes B and F. Byte 17 will occur on the B data line output and in accordance with the foregoing discussion there will be no output on the F data lines. Bit 0 of byte 17 is propagated on line 77 to every data position of the X byte position of the word register and W byte position of the word register. This occurs by bundling line 77 in gates 55 and 53 with the data outputs of the primary or alternate W and X select units. However, data blanking has been taking place in the case of the W and X selection units since because of length two and right justification no control signals are active on either of these two selection gates. Therefore, the output of the X selection and Y select gating units are all zeros. The result of the bundling of the sign bit of the output of the select units is that the sign bit is the only one that can contain information and this information is loaded in the data positions of the W and X byte positions of the word register.

In addition to the data, the sign extension must provide good parity with the particular byte. However, whatever the sign the parity will be a one. The proper parity for an all zeros byte is one and the proper parity for an all ones byte is one. The parity bit for the W and X bytes of the word register are loaded identically to the parity bits when a data blanking takes place. The parity bits will be loaded with ones.

In the last part of a typical sequence of operation of the high speed buffer, that is the moving out of 8 bytes of data to the main storage unit from the high speed buffer, the process used is essentially the same as the move in the bytes. In other words, with respect to the address control unit, 24, the 8 byte transfer is transparent as to whether it is move in or move out.

On the move out, however, on the first cycle, bytes 0 through 7 will be enabled. Thus, on the A output line of the storage 12 will be byte 0 and on the E line byte 4. Since both of these lines have valid data they cannot be bundled. Thus, the lines are treated separately. However, a property of a move out is that the move out is either in the primary or alternate, and therefore the A wires of the alternate A and the primary A can be bundled as for example illustrated by OR gate 81. This provides the 0 output byte for main storage. Similarly, the E line may be bundled or DOT ORed. The main storage is aware that this is the first cycle of move out and will interpret the data on that output line; that is, MS 0 to be byte 0. The same is true of the lines MS 1 through MS 7.

On the second cycle of move out the enable signals 8 through 15 are active and data output line A is byte 8 and data output line E is byte 12. These, however, appear on the lines MS 0 and MS 4. However, at this time the main storage is aware that it is the second cycle of move out and will interpret the data on these data buss lines properly; that is the bytes 8 for MS 0 and byte 12 for MS 4. Thus, the move out is of 8 bytes thereby completed.

From the foregoing discussion it is apparent that although with the 4 byte/8 byte configuration economies and efficiencies are provided, the cycle time is still not increased by the need for additional gating. This is partially achieved by the fact that whether 4 bytes or 8 bytes are being moved out of the storage unit 11, the same wires from the storage unit may be utilized. A separate interface is not required. Similarly, sign extension and blanking allowing the use of half word operands is accomplished with the same gating.

We claim:

1. In a data processing system having a central processing unit (CPU), a main storage (MS) and a high-speed buffer storage (HSB) coupling said CPU to said MS, said MS being coupled to said HSB by parallel line connection means which will accommodate a predetermined plurality of bytes for data out of and into said MS, said HSB comprising: a plurality of primary storage units for storing said predetermined plurality of bytes, each of said storage units corresponding to a predetermined one of said bytes, gating means for bundling the data outputs of selected nonsequential pairs of said storage units, coupling means for separately coupling the data outputs of said selected nonsequential pairs of said storage units to said MS to move said predetermined plurality of bytes into said MS, means for enabling only one of said storage units of each of said pairs of said storage units at any one time, word register means (WR) for coupling said gating means to said CPU, said WR storing a number of bytes corresponding to the number of said nonsequential pairs, said number of bytes being a fraction of said predetermined plurality of bytes.

2. A system as in claim 1 where said gating means includes means for bundling said nonsequential pairs of said storage units so that said storage units in each of said pairs of said storage units are separated from each other by a number of other of said storage units equal to one less than said number of bytes.

3. A system as in claim 1 where said HSB includes a plurality of alternate storage units, where said coupling means includes means for bundling the data outputs of said alternate units with corresponding data outputs of said primary storage units and where said HSB includes means for enabling only one of said primary and alternate storage units at one time.

4. A system as in claim 3 where said bundling means includes DOT OR type gates.

5. A system as in claim 1 where said gating means for bundling includes DOT OR type gates.

6. A system as in claim 1 where the number of bytes of said word register is one-twelfth of said predetermined plurality of bytes.

7. A system as in claim 1 where said gating means include a plurality of selector means each associated with a predetermined byte of said word register means, each of said selector means having individual gates with all of said bundled pairs as respective inputs and having control inputs for selectively enabling a selected one of said individual gates in each of said plurality of selector means for coupling data carried on the bundled pair to said associated byte of said WR.

8. A system as in claim 7 including alignment control means responsive to an address input from said CPU to provide control signals for said control inputs for storing data in said WR in a predetermined alignment.

9. A system as in claim 8 where said control means includes means responsive to length and left/right justification instructions from said CPU for left/right justifying data in said WR.

10. A system as in claim 9 where each byte of said WR includes separate input gating means for data and for a parity bit and includes a plurality of parity bit generators, one corresponding to each byte of said WR, said generators responsive to a coincidence condition of said control signals and coupled to the control inputs of a corresponding selector means for storing a parity bit in said WR, said coincidence condition of said control signals occurring only when none of said individual gates of a selector means is enabled whereby the byte of said associated WR is blanked.

11. A system as in claim 10 including sign extension means for extending the sign of a byte stored in said WR when only the lower half of said WR is to be filled with data and the upper half is blanked, said sign extension means comprising: gating means responsive to an extend sign control signal, responsive to a signal for enabling the upper byte of said lower half of said WR and responsive to the highest-order bit of said upper byte for coupling said highest-order bit to said data input gates of said blanked bytes.

12. In a data processing system operating during timed system cycles, the apparatus comprising, a processing unit having first parallel line connection means for transferring in one system cycle a first predetermined number of bytes of data into or out from said processing unit, a main storage having second parallel line connection means for transferring in one system cycle a second predetermined number, not equal to said first predetermined number, of bytes of data into or out from said main storage, a buffer storage for coupling said processing unit to said main storage, said buffer storage including a number, equal to said second predetermined number, of first multi-bit, parallel-arrayed storage units; including selectable gating means for connecting said first storage units to said first parallel line connection means or to said second parallel line connection means; and including enabling means connected to said gating means for selecting bytes of data from a number, equal to said first predetermined number, of said first storage units for transfers between said processing unit and said buffer storage and for selecting bytes of data from a a number, equal to said second predetermined number, of said first storage units for transfers between said buffer storage and said main storage.

13. The apparatus of claim 12 wherein said second parallel line connection means includes means for transferring in one cycle said second predetermined number, greater than said first predetermined number, of bytes of data into or out from said main store.

14. The apparatus of claim 12 where said buffer storage includes a number, equal to said second predetermined number, of second multi-bit parallel-arrayed storage units; where said gating means includes means for bundling first data lines from said first storage units with corresponding second data lines from said second storage units; and where said enabling means includes means for selecting some of said first and second data lines.

15. In a data processing system operating during timed system cycles, the apparatus comprising, a processing unit having first parallel line connection means for transferring in one system cycle a first predetermined number of bytes of data into or out from said processing unit, main storage having second parallel line connection means for transferring in one system cycle a second predetermined number, not equal to said first predetermined number, of bytes of data into or out from said main storage, a buffer storage for coupling said processing unit to said main storage, said buffer storage including a number, equal to said second predetermined number of first storage units and of second storage units; including selectable gating means, said gating means having coupling means for bundling first data lines from said first storage units and for bundling second data lines from said second storage units, said gating means connecting said first or said second storage units to said first parallel line connection means or to said second parallel line connection means; and including enabling means connected to select said gating means for selecting bytes of data from a number, equal to said first predetermined number, of said first or said second storage units for transfers between said processing unit and said buffer storage and for selecting bytes of data from a number, equal to said second predetermined number, of said first or said second storage units for transfers between said buffer storage and said main storage.

16. The apparatus of claim 15 where said buffer storage includes accessing means for accessing said first number of bytes of data from said first storage units and from said second storage units for transfers between said processing unit and said buffer storage and for accessing said second number of bytes from said first storage units or from said second storage units for transfers between said main storage and said processing unit.

17. In a data processing system operating during timed system cycles and including a processing unit having first parallel line connection means, including a main store having second parallel line connection means, including a high-speed buffer having a predetermined number of multi-bit, parallel-arrayed storage units, including selectable gating means for connecting said storage units to said first or to said second parallel line connection means, the method comprising, enabling said gating means for a first system cycle to select bytes of data from said predetermined number of storage units, transferring in said first system cycle a first number, equal to said predetermined number, of bytes of data between said processing unit and said buffer through said gating means, enabling said gating means for a second system cycle to select bytes of data from a second number, not equal to said predetermined number, of said storage units, transferring in said second system cycle a number, equal to said second number, of bytes of data between said main store and said buffer through said gating means.

* * * * *

UNITED STATES PATENT AND TRADEMARK OFFICE

CERTIFICATE OF CORRECTION

PATENT NO. : 3,858,183

DATED : December 31, 1974

INVENTOR(S) : Gene M. Amdahl, et al.

It is certified that error appears in the above-identified patent and that said Letters Patent are hereby corrected as shown below:

Claim 6, column 11, line 16, cancel "one-twelfth" and substitute therefor -- one-half --.

Claim 12, column 12, line 13, cancel the second "a".

Signed and Sealed this

Twentieth Day of July 1976

[SEAL]

*Attest:*

RUTH C. MASON
*Attesting Officer*

C. MARSHALL DANN
*Commissioner of Patents and Trademarks*